Nov. 1, 1966  H. H. FOWLER  3,282,287
AUTOMATIC VALVE LUBRICATING DEVICE
Filed Aug. 9, 1963  4 Sheets-Sheet 1

INVENTOR
HERMAN H. FOWLER

BY  Strauch, Nolan & Neale
ATTORNEYS

INVENTOR
HERMAN H. FOWLER

BY Strauch, Nolan & Neale
ATTORNEYS

United States Patent Office 3,282,287
Patented Nov. 1, 1966

3,282,287
AUTOMATIC VALVE LUBRICATING DEVICE
Herman H. Fowler, Kearney, Nebr., assignor to Rockwell Manufacturing Company, Pittsburgh, Pa., a corporation of Pennsylvania
Filed Aug. 9, 1963, Ser. No. 301,157
17 Claims. (Cl. 137—246.13)

The present invention relates to automatic valve lubricating devices and is especially concerned with novelly combined power operator and automatic lubricator assemblies for plug type valves.

The invention herein is particularly useful in conjunction with the operation of ball valves and will be described in the disclosed embodiments as applied to such valves. It will be understood by those skilled in the art, however, that the invention also may be appied wih corresponding advanage to various other types of plug valves and particularly to rotary plug valves.

In certain aspects, the present invention constitutes an improvement over the lubricated ball valve assemblies disclosed in United States Letters Patent No. 2,788,015 granted to George F. Scherer on April 9, 1957, and United States Letters Patent No. 2,979,071, granted to Robert H. Herring et al. on April 11, 1961. In the ball valve assemblies disclosed in these patents, pressurized lubricant is injected into valve seat grooves by conduits passing through the walls of the valve body to jack the ball plug from its seat and thereby lessen the torque effort needed to open and close the valve. The pressurized lubricant, being distributed over the interface between the ball periphery and the ball seating structure, in addition to reducing friction resistance, is particularly effective to free the ball in the event it becomes stuck or "frozen" to its seats in closed position.

While such lubricated ball valves provide generally satisfactory service in many applications, they are subject to certain shortcomings which are particularly prevalent in large-sized valve structures requiring motorized valve operators. In this regard, perhaps one of the most troublesome difficulties in prior automatically lubricated plug valves, particularly of the ball type described above, its that, under certain operating conditions, a substantial or complete depletion of lubricant supply frequently occurs in one operational cycle of opening and reclosing the valve. Such objectionable losses of lubricant supply are most likely to occur when a large fluid line pressure differential is built up across the valve plug in valve closed position requiring a relatively high lubricant pressure of several thousand pounds for injecting a sufficient amount of lubricant into the valve seat grooves to adequately reduce the torque effort needed to turn the plug. Under this condition, the needed high pressure applied to the lubricant supply in valve closed position will quickly force objectionably large amounts of the lubricant between the plug and seat and into the fluid line as soon as the valve is opened sufficiently to balance the line pressure on opposite sides of the plug.

To overcome the foregoing problem, the present invention contemplates a novel automatic lubricating device which injects lubricant under sufficient pressure into the valve seat grooves only during the initial movement of the valve plug from fully closed to open position. As a result, excessive depletion of the lubricant supply is prevented without requiring the reduction of the pressure during the time in which lubricant is being fed to the valve seat grooves. Supply of pressurized lubricant is automatically blocked, according to the present invention, by means of a special valve disposed in the lubricant supply passage and positioned by a fluid pressure valve operator to close when the valve plug is turned by the operator through a predetermined angle from valve closed position.

Accordingly, it is the major object of the present invention to provide a novel automatic valve lubricator which furnishes pressurized lubricant to a valve plug seat only during the initial movement of the plug from fully closed to open position.

Another object of the present invention is to provide a novel automatic lubricator and power operator assembly wherein the power operator is operative to automatically control the actuation of a lubricant shut-off valve.

A further object of the present invention is to provide a combined automatic lubricator and power operator assembly for a plug valve wherein the lubricator and operator are energizable from a common fluid pressure source.

Still another object of the present invention resides in the provision of a combined automatic lubricator and power operator as in the preceding object wherein the fluid pressure force applied to inject the valve lubricant is greater than the fluid pressure force applied to energize the valve operator to assure adequate flow of lubricant to the plug valve seating interface even though the needed force applied to turn the plug is small.

Another object of the present invention is to provide a novel compact automatic lubricator and power operator assembly wherein the lubricator is energized by pressure fluid and is mounted directly on one of the cylinders of the power operator.

Further objects of the invention will appear as the description proceeds in connection with the appended claims and the annexed drawings wherein:

Figure 1:
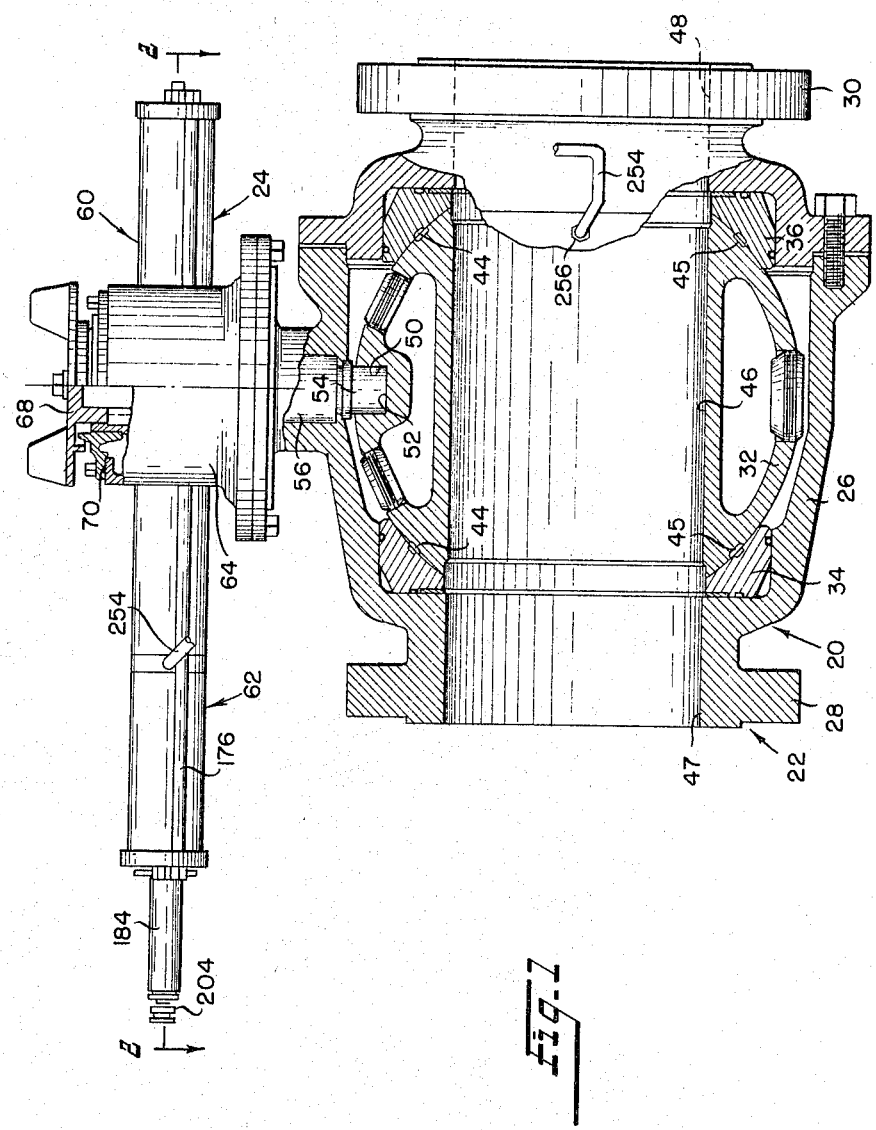
FIGURE 1 is a partially sectioned longitudinal elevation of a power operated automatically lubricated plug valve assembly showing an automatic lubricator constructed according to a preferred embodiment of the present invention and mounted on one of the cylinders of a four-cylinder power operator.

Referring now to the drawings and more particularly to FIGURE 1, the reference numeral 20 generally designates a ball valve assembly comprising two main subassembly units: a ball valve proper 22 and a power operator and automatic lubricator unit 24.

Ball valve 22 is of conventional construction such as that shown in said United States Letters Patent No. 2,979,071 and, as shown in FIGURE 1, comprises a valve casing assembly 26 having line attachment flanges 28 and 30 at opposite ends. A substantially spherical ball plug 32 is rotatably mounted on a pair of axially spaced apart annular rigid metal seat rings 34 and 36 secured in casing assembly 26. Each of the seat rings 34 and 36 is provided with shallow lubricant grooves 44 of substantially uniform depth. The surface of plug 32 may also be formed with cooperating grooves generally indicated at 45.

Plug 32 contains the usual diametrical passage 46 adapted to register with axially aligned cylindrical line fluid bores 47 and 48 when the plug is rotated 90° about its upstanding axis from a closed position to the fully opened position shown in FIGURE 1. The upper surface of plug 32 contains a straight sided slot 50 having an arcuate bottom wall 52 and adapted to receive a straight sided tang 54 fixed to the lower end of a rotatable valve actuating stem 56.

Figure 2:
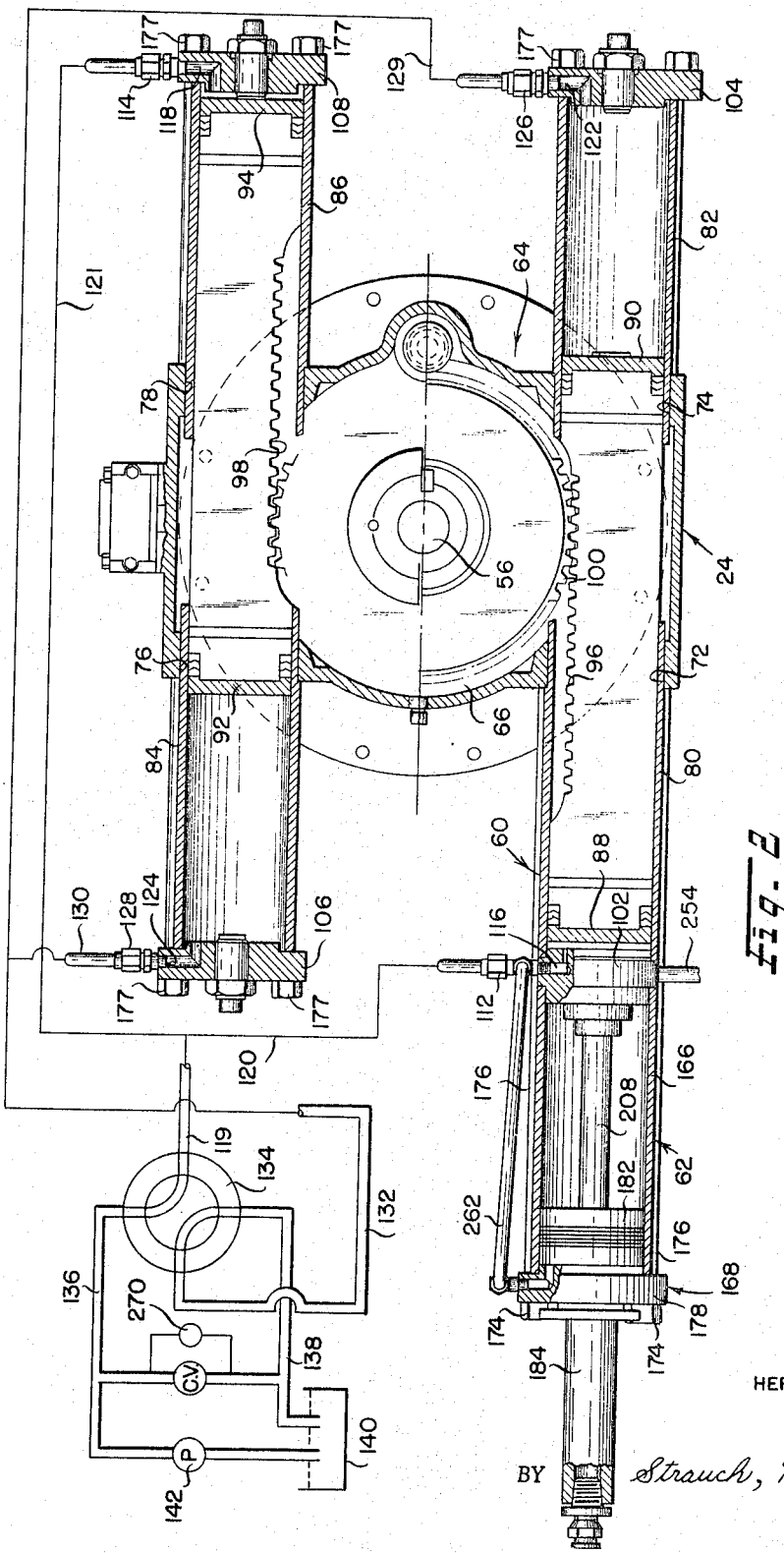
FIGURE 2 is an enlarged section taken substantially along lines 2—2 of FIGURE 1 and diagrammatically illustrating the motor fluid system for energizing the lubricator and the operator and showing the lubricator and operator parts in valve closed position.

With reference now to FIGURES 1 and 2, mechanism 24 for operating, lubricating and "jacking" plug 32 essentially comprises a power operator 60 and an automatic lubricating device 62. Operator 60 comprises a hollow integral cast housing 64 fixedly mounted on the head of casing assembly 26 and forming a compartment 66 into which valve stem 56 upwardly projects. A removable cover plate 68 extends over a top opening 70 formed in housing 64 to provide access to the internal parts of the operator.

With continued reference to FIGURES 1 and 2, housing 64 is provided with four end openings, 72, 74, 76 and 78 which are arranged in parallel aligned pairs. Openings 72 and 76, disposed on one side of stem 56, respectively axially align with openings 74 and 78 on the opposite side of stem 56. Openings 72, 74, 76 and 78 are medially disposed on opposite sides of stem 56 and have their axes extending parallel to the longitudinal axis of ball valve 22.

With continued reference to FIGURE 2, four cylinders 80, 82, 84 and 86, each comprising rigid tubular members, are respectively rigidly mounted as by welding with a fluid tight fit in openings 72, 74, 76 and 78. Respectively mounted in the bores of cylinders 80, 82, 84 and 86 for reciprocable movement are single acting power pistons 88, 90, 92 and 94. Pistons 88 and 90 are rigidly interconnected for simultaneous operation by a gear rack 96 extending coaxially through openings 72 and 74 at one side of valve stem 56. Similarly, pistons 92 and 94 are rigidly interconnected for simultaneous operation by a gear rack 98 disposed on the opposite side of stem 56 and extending coaxially through housing openings 76 and 78.

Within operator housing 64, a gear 100 is fixedly secured to stem 56 and is in constant meshing engagement with racks 96 and 98. As racks 96 and 98 are power shifted in opposite directions, a torque couple is applied to gear 100 to selectively turn valve stem 56 in one direction or the other for opening and closing valve 22.

With continued reference to FIGURE 2, the inner ends of cylinders 80, 82, 84 and 86 are open in communication with compartment 66. The outer ends of cylinders 80, 82, 84 and 86 are respectively closed by cylinder heads 102, 104, 106 and 108.

In order to selectively control the introduction of pressure fluid into cylinders 80, 82, 84 and 86 to facilitate power operation of valve stem 56 in a counterclockwise direction, hydraulic pressure fluid is simultaneously introduced into the outer ends of cylinders 86 and 80 through fittings 112 and 114 respectively threaded into fluid passages 116 and 118 formed in cylinder heads 102 and 108. A common fluid conduit 119 is connected to fittings 112 and 114 by branch conduits 120 and 121 respectively.

When fluid is admitted to cylinders 80 and 86, fluid in the outer ends of cylinders 82 and 84 is concomitantly exhausted through fluid passages 122 and 124 respectively formed in cylinder heads 104 and 106. Standard fittings 126 and 128 threaded into the outer ends of passages 122 and 124 respectively are attached to branch fluid lines 129 and 130 which are connected to a common fluid conduit 132. Conduits 119 and 132 are connected to separate ports in a manually operably reversing valve 134 which is of conventional construction.

In the position of valve 134 shown in FIGURE 2, line 119 is in fluid communication with a pressurized fluid supply conduit 136 and conduit 132 is in fluid communication with a fluid exhaust conduit 138. Conduit 138 terminates in a suitable fluid reservoir 140. A conventionally constructed pump 142 disposed in supply conduit 136 draws fluid from reservoir 140 and supplies it under pressure to control valve 134.

Thus, by admitting pressurized fluid to the outer ends of cylinders 80 and 86 and by exhausting fluid from the outer ends of cylinders 82 and 84, racks 96 and 98 are respectively shifted to the right and to the left as viewed from FIGURE 2 to apply a balanced torque couple to turn gear 100 and stem 56 in a counterclockwise direction.

When it is desired to turn valve stem 56 in a clockwise direction, control valve 134 is operated to reverse the connections to supply and return conduits 136 and 138 to apply fluid under pressure to the outer ends of cylinders 82 and 84 and to exhaust fluid from cylinders 80 and 86. As a result, racks 96 and 98 are respectively shifted to the left and to the right for effecting clockwise rotation of gear 100 and valve stem 56. Valve stem 56 is rotatable by operator 60 through an angular distance of 90° between fully opened and fully closed positions and conventionally coacts with stops limiting the piston strokes beyond these positions.

With the exception of fitting 112 and cylinder head 102, essentially, the construction of valve operator 60 described above is conventional as shown in United States Letters Patent No. 3,056,573, issued October 2, 1962, to Edmund E. Matheson et al.

Figure 3:
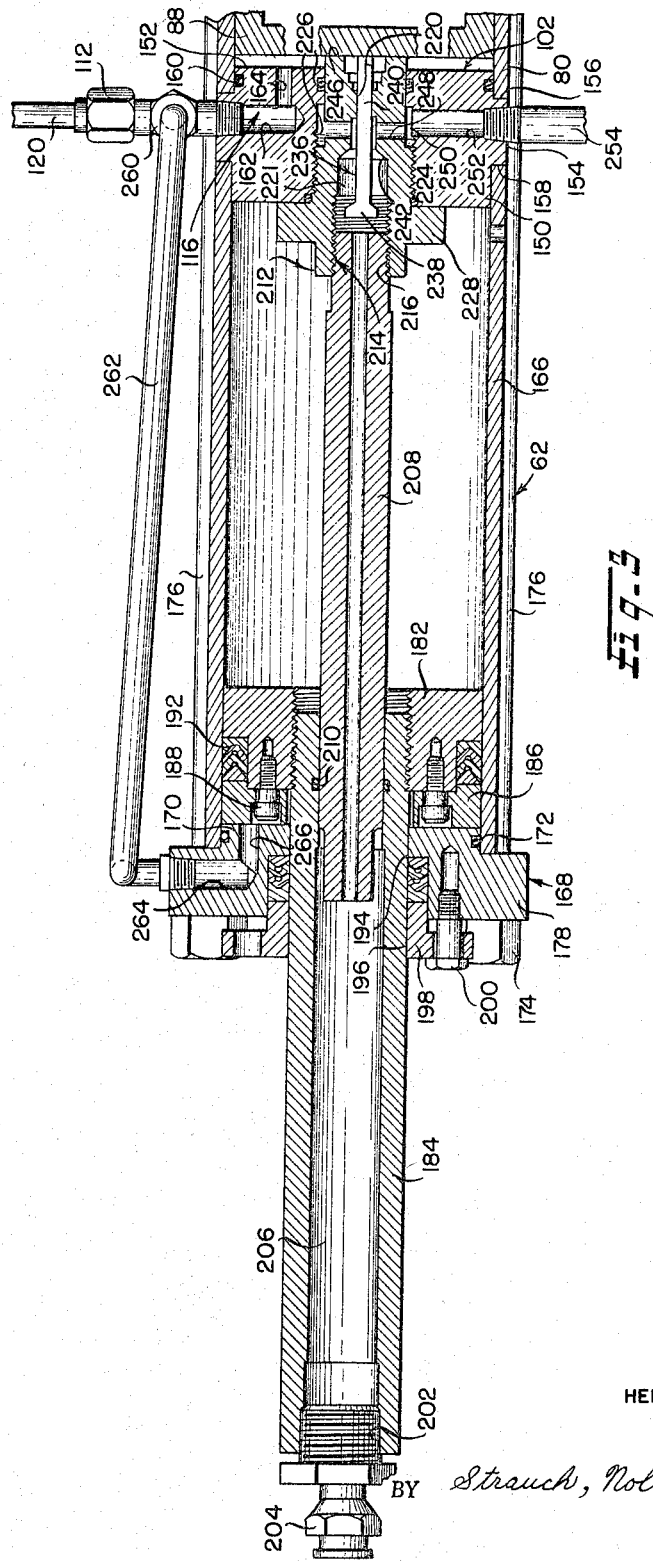
FIGURE 3 is an enlarged fragmentary longitudinal section of the automatic lubricator illustrated in FIGURE 2.

Referring now to FIGURES 2 and 3, cylinder head 102 comprises a cylindrical member which is stepped providing reduced diametered axially spaced apart end sections 150 and 152 integrally joined by an enlarged diametered intermediate section 154 to provide axially directed oppositely facing annular shoulders 156 and 158. Section 152 coaxially and snugly projects into the outer end of cylinder 80 and is provided with an O-ring and groove assembly 160 to establish a fluid tight seal with the inner periphery of cylinder 80. Shoulder 156 is seated against the outer end of cylinder 80 and the diameter of intermediate section 154 preferably is equal to the outer diameter of cylinder 80 as shown. Fluid passage 116 comprises a radial blind bore 162 intersected at its inner end by a bore section 164 extending axially inwardly from the inner end face of cylinder head 102 in parallel and laterally offset relationship to the common longitudinal axis of head 102 and cylinder 80. The outer end of bore 162 is threaded to receive fitting 112 as shown.

With continuing reference to FIGURES 2 and 3, lubricator 62 is provided with a fluid motor cylinder 166 which comprises a tube coaxially and tightly receiving cylinder head section 150 and abutting shoulder 158. Cylinder 166 preferably is of the same diameter as cylinder 80 and coaxially extends forwardly from cylinder head 102. The end of cylinder 166 remote from operator cylinder 80 snugly and coaxially receives a reduced diametered cylindrical end section 170 of a cylinder head 168. A groove seated O-ring 172 carried by section 170 establishes a fluid tight seal with the inner periphery of cylinder 166. Heads 168 and 102 and cylinders 80 and 166 are axially clamped together for retention on housing 64 by nuts 174 threaded on the outer ends of stay bolts 176 axially extending through portion 178 formed integral with head 168. Stay bolts 176 are parallel with the common longitudinal axis of cylinders 80 and 166 and are threaded at their inner ends in housing 64. Cylinder heads 104, 106 and 108 and their respective cylinders 82, 84 and 86 similarly are detachably secured to housing 64 by stay bolt and nut assemblies generally indicated at 177.

As best shown in FIGURE 3, an annular lubricator power piston 182 coaxially receives and is threaded on the inner end of an elongated lubricant reservoir cylinder 184 extending coaxially into cylinder 166. A rigid annular packing retainer plate 186 is detachably secured to piston 182 as by cap screws 188. Retainer plate 186 axially confines a suitable packing 192 carried by piston 182.

Cylinder 184 extends slidably through aligned openings 194 and 196 coaxially formed in cylinder head 168 and a rigid packing gland 198 detachably fixed to head 168 operator piston 88 which has begun to move towards operator housing 64. Plunger 236, under the force exerted by lubricant pressure will axially follow piston 88 as it moves toward valve open position. While plunger 236 is still unseated, lubricant from chamber 221 will flow around stem 240 and into bore 218. From bore 218, the lubricant is displaced through bores 248 and 252, through conduit 254 and through the internal ball valve passages into valve seat grooves 44. From grooves 44, the lubricant is distributed over the seating surfaces of plug 32 and rings 34 and 36 in the usual manner to jack plug 32 off seat rings 34 and 36 and to reduce the turning effort required to open the valve. Supply of lubricant will continue as long as plunger 236 is prevented from closing by abutment with operator piston 88 which is being displaced in a direction axially away from head 102.

While not shown in the drawings, suitable valve means is usually supplied in conduit 254 to selectively connect to the valve body internal passages leading to the lubricant groove 44 in seat ring 36, or the lubricant groove 44 in seat ring 34. This is done whenever the possibility of reversal of line flow exists.

When piston 88 reaches a predetermined position in its movement toward operator housing 64, plunger 236 will be axially displaced sufficiently far by the pressure of displaced lubricant in chamber 221 to seat tightly against shoulder 242 thus blocking further flow of lubricant to grooves 44. The displacement of piston 88 to the position where plunger 236 blocks flow of lubricant corresponds to an angular displacement of valve plug 32 of preferably 5 degrees from its fully closed position. This initial angular displacement of valve plug 32 during which lubricant is permitted to flow under pressure into lubricant grooves 44 corresponds to the axial distance between plunger head 238 and seat 242 in the position of parts shown in FIGURE 3. By selectively threading assembly 212 in either direction in cylinder head 102 the limit of movement of piston 88 can be adjusted, and the position of the ball plug 32 in the valve closed position can be controlled. Thus, the aforementioned initial angular displacement during which the lubricant is permitted to flow can be while the valve is still completely closed or can be selected to be operative during the portion of valve operation known as "cracking" the opening.

After plunger 236 blocks flow of lubricant, further displacement of operator pistons 88 and 94 completes the movement of valve plug 32 to its fully opened position shown in FIGURE 1. Piston 182 also continues to be shifted slightly towards head 102 by motor operating fluid in cylinder 166 after plunger 236 is seated in its closed position to build up the pressure of lubricant in chamber 206. This increased lubricant pressure tightly holds plunger 236 against seat 242 to insure that no leakage of lubricant occurs while operator 62 is completing the opening movement of valve plug 32.

When valve plug 32 reaches its fully opened position, a valve 270 (FIGURE 2) may be opened to return pressure fluid in cylinders 80, 86 and 166 and fluid lines 119, 120 and 121 to reservoir 140.

When it is desired to close valve plug 32, valve 134 is turned to selectively connect lines 119 and 132 to lines 138 and 136 respectively so that operator fluid is supplied under pressure to cylinders 82 and 84 and any fluid in cylinders 80, 86 and 166 is exhausted. Operator 62 is thus actuated to rotate valve stem 56 in a clockwise direction (as viewed from FIGURE 2) towards valve closed position.

As valve 22 closes, piston 88 is axially moved towards head 102 to a position where it engages the head of plunger stem 240 to axially push plunger 236 ahead of it to the open position shown in FIGURE 3. Displacement of piston 88 is limited by abutment with stop face 246 on screw 212. The valve operator and automatic lubricating device are now positioned for opening valve 22 again.

From the foregoing it is clear that pressurized lubricant in chamber 221 coacts with piston 88 to shift plunger 236 to its closed position for blocking flow of pressurized lubricant to grooves 44 upon a predetermined and adjustable initial rotational movement of valve plug 32 from fully closed to open position. Thus, flow of lubricant is automatically blocked to prevent objectionable depletion of lubricant supply particularly when valve plug 32 opens sufficiently to equalize the upstream and downstream line fluid pressures and the lubricant grooves both in the seat rings and the ball are exposed to the line fluid. By automatically supplying lubricant under pressure to the valve seats, and particularly the downstream valve seat, while plug 32 is being turned through an initial predetermined angular distance, considerable reduction in turning torque is effected to thereby permit a smaller power operator to be used for opening and closing valve 22.

Figure 4:
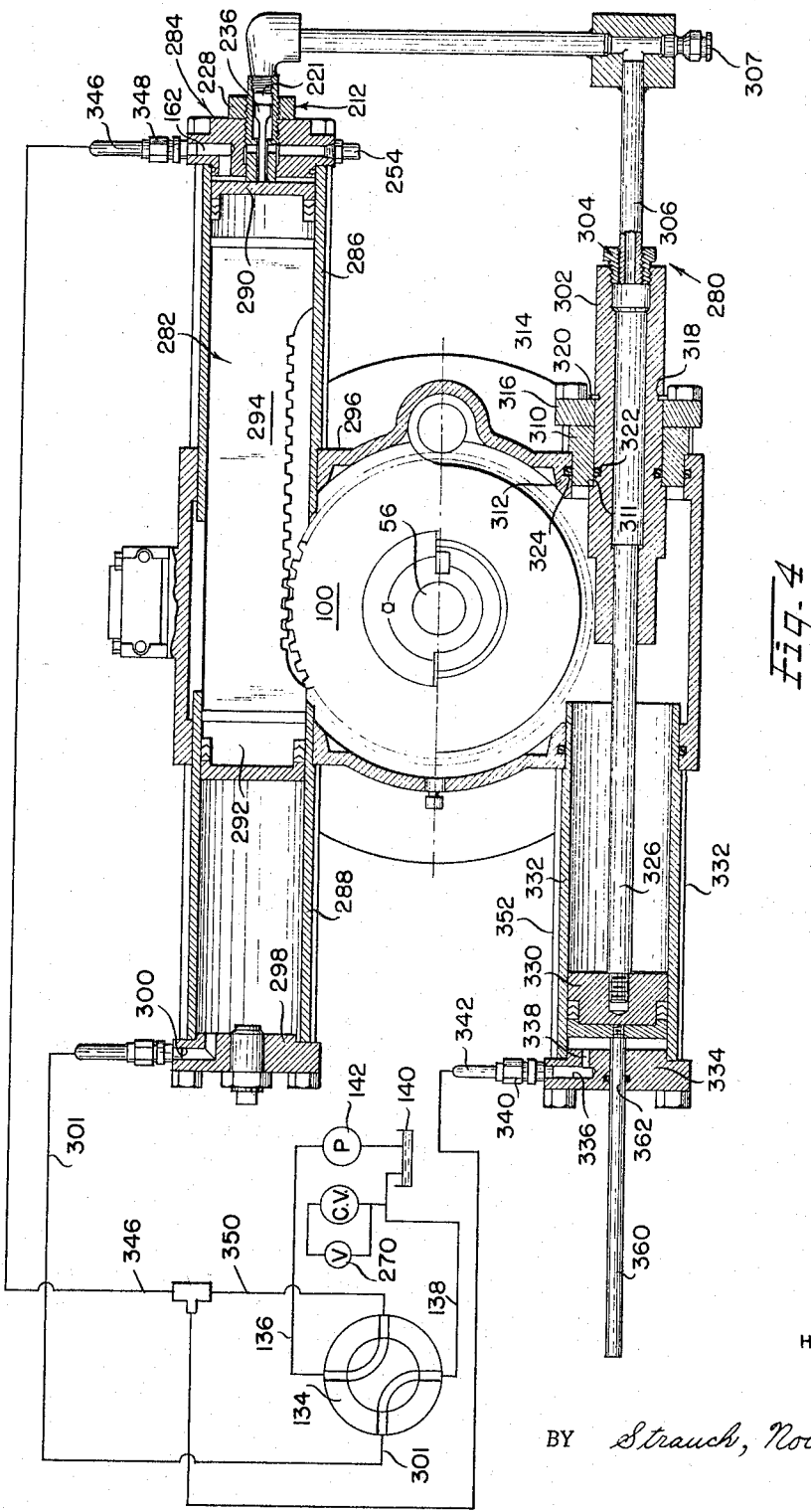
FIGURE 4 is a horizontal longitudinal section similar to FIGURE 2 and illustrating a further embodiment of the present invention as applied to a two-cylinder power operator for a lubricated plug valve assembly.

In the embodiment illustrated in FIGURE 4, wherein like reference numerals are identified by parts, a modified automatic lubricating device 280 is incorporated with a two-cylinder power operator 282. Except for cylinder head 284, operator 282 may be of any conventional and suitable construction, and, for the purposes of the present invention, is shown to comprise axially aligned cylinders 286 and 288 respectively reciprocably receiving power pistons 290 and 292. Rigidly connecting pistons 290 and 292 is a rack 294 meshing with gear 100 which is fixed to valve stem 56 as previously described. Stem 56 projects upwardly into an operator housing 296 secured to valve body 26 and rigidly mounting cylinders 286 and 288.

The outer end of cylinder 288 is closed by a conventionally constructed cylinder head 298 having a fluid port 300 for introducing and exhausting motor operating fluid. A fluid conduit 301 connects port 300 to control valve 134. The outer end of cylinder 286 is closed by head 284 which is essentially of the same construction as cylinder head 102 with like reference numerals identifying like structure.

In the same manner as described in the embodiment of FIGURES 1–3, cylinder head 284 threadedly mounts adjusting screw 212 which slidably carries the lubricant shut-off plunger 236. This assembly of the cylinder head, adjustment screw and plunger is essentially identical to that described in the previous embodiment.

To furnish lubricant under pressure to chamber 221 in screw 212, lubricating device 280 comprises an open-ended lubricant cylinder 302 which is threaded at one end to receive a bushing 304 for attaching a lubricant supply line 306 which is connected to screw 212 to establish fluid communication between chamber 221 and the interior of cylinder 302. The supply of lubricant in cylinder 302 is replenished through a fitting 307 in line 306.

Cylinder 302 coaxially extends through a rigid annular holder 310 abutting against an external annular shoulder 311 on cylinder 302 and coaxially received in a hollow boss 312 formed in operator housing 296. Holder 310 is detachably fixed to housing 296 as by cap screws 314 extending through an annular retainer plate 316. Plate 316 abuts the end of holder 310 projecting beyond boss 312 to urge holder 310 into snug contact with shoulder 311. As shown, cylinder 302 slidably extends coaxially through pate 316 and has an annular groove 318 in which a retainer ring 320 is seated. Ring 320 bears against the outwardly facing surface of plate 316 to axially retain cylinder 302 against movement.

A groove-seated resilient O-ring 322 carried by cylinder 302 is compressed against the inner periphery of holder 310 to provide a fluid tight seal. Similarly, a groove-seated resilient O-ring 324 carried in boss 312 engages the outer periphery of holder 310 to prevent leakage of fluid.

as by cap screws 200. Cylinder 184 projects axially beyond cylinder head 168 in coaxial alignment with cylinder 166 and terminates at its outer remote end in an internally threaded section 202 which receives a fitting 204 by which suitable lubricant is introduced into a lubricant reservoir 206 defined by cylinder 184.

With continued reference to FIGURE 3, the inner end of cylinder 184 coaxially and telescopically receives a fixed tube 208 which provides a supply and return conduit for lubricant reservoir chamber 206. A groove seated O-ring 210 carried by cylinder 184 surroundingly engages tube 208 to prevent leakage of fluid.

Rigidly mounting tube 208 is an adjusting screw 212 which is coaxially formed with a stepped through bore 214 to provide successively reduced diametered coaxial bore sections 216, 218 and 220 extending axially toward operator cylinder 80 from the adjacent end of cylinder 166. The end of tube 208 remote from reservoir chamber 206 is threadedly received in bore section 216 and cooperates therewith to delimit a valve chamber 221. Screw 212 is threadedly secured in an internal threaded section 224 of a bore 226 extending coaxially through operator head 102. Tube 208 thus is rigidly mounted with operator head 102 and slidably mounts cylinder 184 and piston 182.

By axially and unitarily displacing cylinder 184 and piston 182 towards operator cylinder 80, the volume of chamber 206 is diminished to increase the pressure of lubricant and thus force it through tube 208 and into valve chamber 221.

The portion of screw 212 projecting beyond bore 226 and into cylinder 166 is provided with an integral nut portion 228 which is engageable by a tool (not shown) to axially adjust the position of screw 212 relative to head 102 for a purpose to be presently described. The tool for turning screw 212 is insertable into cylinder 166 by removing head 168, cylinder 184 and piston 182.

With continued reference to FIGURE 3, a lubricant shut-off plunger 236 having an enlarged head 238 disposed in chamber 221 is formed with an elongated cylinder actuating stem 240 slidably extending through bore section 220. Plunger head 238 is shown in its valve-opened position and is axially shiftable toward operator cylinder 80 to engage a valve seat comprising an annular shoulder 242 formed around stem 240 at the juncture between bore sections 216 and 218.

In accordance with the present invention, stem 240 projects axially beyond screw 212 and into operator cylinder 80 by a predetermined distance when plunger head 238 seats on shoulder 242. In this position, flow of lubricant between bore 218 and chamber 221 is blocked and stem 240 is engageable by operator piston 88 near the end of its stroke as it moves axially towards cylinder head 102. Upon engagement of piston 88 with stem 240 and continued piston displacement toward the positions of the components shown in FIGURE 3, plunger 236 is axially displaced towards tube 208 by an equal distance to unseat plunger head 238 and thereby establish fluid communication between chamber 221 and bore 218.

As best shown in FIGURE 3, screw 212 projects axially beyond cylinder head 102 and into operator cylinder 80, and terminates in a flat end face 246 contained in a plane extending at right angles to the longitudinal axis of cylinder 80. End face 246 is adapted to serve as a stop to limit movement of operator piston 88 toward head 102.

With continuing reference to FIGURE 3, bore 226 is connected by angularly spaced apart radial passages 248 to an annular space 250 surrounding screw 212 and delimited by bore 226. A radial through bore 252 formed in cylinder head section 154 opens into annular space 250 and is connected at its outer end to a fluid conduit 254.

As shown in FIGURE 1, conduit 254 is connected by a fitting 256 to internal lubricant passages (not shown) formed in valve body 26 and leading to lubricant grooves 44.

Referring again to FIGURE 3, fitting 112 is of the T-type having a side port connection 260 for furnishing pressure fluid to axially displace lubricator piston 182 from the position shown in the drawings. A conduit 262 is threaded at one end to connection 260 and at the opposite end to a radial blind bore 264 formed in the flange portion 178 of lubricator head 168. The bottom of bore 264 is intersected by an axial fluid passage 266 formed in head 168 and opening into lubricator cylinder 166. Thus, fluid is simultaneously introduced into and exhausted from cylinders 166, 80 and 86.

Since a common source of fluid is used to actuate pistons 182, 88 and 94, the unit pressure of the fluid in cylinders 166, 80 and 86 will be substantially the same. Lubricator piston 182 transfers the force to the cylinder 184 containing the lubricant. This means that the unit pressure applied to the lubricant will be increased by the ratio of surface area of piston 182 to the cross-section area of chamber 206. Thus, when the valve 134 is moved to deliver actuator fluid to pistons 182, 88 and 94, the pressure forcing lubricant into the grooves 44 of the seat rings 34 and 36 is considerably increased over the pressure used to actuate the valve operator. This allows the use of the fluid in the pipeline to be used to operate the valve whenever other conditions allow this use, inasmuch as the increased pressure then delivers the lubricant to the seat grooves 44 at a pressure above the supply pressure of the operator, guaranteeing lubricant flow.

As a result of the foregoing, a rapid and large flow of lubricant from reservoir chamber 206 to valve seat grooves 44 is assured even when the pressure of fluid displacing operator pistons 89 and 94 is relatively low. This is particularly important in the present invention since plunger 236 is effective to permit flow of lubricant to grooves 44 only for a short angular displacement of valve plug 32 in a manner to be presently explained in detail. The pressure of motor operating fluid in cylinders 80 and 86 will be comparatively low when there is low resistance to the torque applied to turn valve plug 32. This condition frequently occurs when the pressure of fluid in the line containing ball valve 22 is low and substantially balanced.

With valve 22 in fully closed position the parts of lubricator 62 and operator 60 are in the positions shown in FIGURES 2 and 3. Piston 88, in valve closed position, is in its extreme position remote from operator housing 64 and in abutment with stop face 246 on screw 212, thus maintaining plunger 236 in an open position where head 238 is unseated to establish fluid communication between chamber 221 and bore 218. To open valve 22, control valve 134 is turned to respectively connect lines 136 and 138 to lines 119 and 132 so that operator fluid under pressure is admitted simultaneously to cylinders 80, 86 and 166. At the same time fluid from cylinders 82 and 84 is exhausted. The fluid pressure acting on operator pistons 88 and 94 axially displaces racks 96 and 98 in opposite directions to apply a torque couple for rotating stem 56 counterclockwise towards valve open position.

Concomitantly with the axial displacement of pistons 88 and 94, lubricator piston 182 is axially shifted from the position shown in FIGURE 3 toward operator head 102 by fluid pressure introduced into cylinder 166 through conduit 262, bore 264 and passage 266. Lubricator cylinder 184, being rigidly connected to piston 182, will be unitarily displaced therewith to reduce the effective free volume of lubricant reservoir chamber 206. The resulting pressure applied to lubricant in chamber 206 by diminishing the chamber volume displaces lubricant through tube 208 and into valve chamber 221.

The pressure of lubricant supplied to chamber 221 axially displaces plunger 236 to the right as viewed from FIGURE 3 to maintain stem 240 in firm abutment with With continued reference to FIGURE 4, a reciprocable elongated cylindrical piston 326 slidably and coaxially extends into cylinder 302 through the end thereof opposite from bushing 304. The end of piston 326 projecting beyond cylinder 302 is coaxially threaded into a power piston 330 which is reciprocably mounted in a fluid motor cylinder 332. As shown in FIGURE 4, cylinder 332 is provided with an open end facing and axially spaced from cylinder 302. The opposite end of cylinder 302 is closed by a cylinder head 334 having intersecting passages 336 and 338 leading to the interior of cylinder 332 behind piston 330. Passage 336 is threaded to receive a standard fitting 340 for attaching a conduit 343 which leads to a T-fitting 344. Attached to fitting 344 is a fluid conduit 346 which is connected at its opposite end to a fitting 348 threaded into bore 162 of cylinder head 284. The remaining port of T-fitting 344 is attached to a main fluid conduit 350 which is connected to control valve 134 in the same manner as is line 119 in the embodiment of FIGURES 1–3.

As shown, the axes of cylinders 286 and 332 are in parallel spaced apart relationship. Head 334 and cylinder 332 are detachably fixed as a unit to housing 296 as by stay bolt and nut assemblies indicated generally at 352.

The operation of the power operator and automatic lubricating device illustrated in FIGURE 4 is essentially the same as that for the embodiment of FIGURES 1–3. As shown, the components of operator 282 and lubricator 280 are in valve closed position. To open valve 22, control valve 134 is manipulated to connect lines 136 and 138 to lines 350 and 301 respectively. Fluid under pressure is thus introduced under pressure into cylinder 286 to rotate stem 56 in the counterclockwise direction. Concomitantly, fluid pressure is introduced into cylinder 332 to urge lubricant piston 326 to the right from the position shown. As a result lubricant under pressure is fed into line 306 and into chamber 221 where it flows around plunger 236 and into conduit 254 for injection into grooves 44 in the manner previously described. Displacement of piston 290 to a position corresponding to approximately five degrees opening movement of valve plug 32 from fully closed position will permit lubricant pressure in chamber 221 to urge plunger 236 against its seat 242, thus blocking further flow of lubricant.

After plunger 236 is moved to its closed position further unitary displacement of pistons 330 and 326 by application of fluid pressure in cylinder 332 increases the pressure of lubricant in chamber 221 to insure that plunger 236 is firmly seated in place. Displacement of pistons 330 and 326 will terminate when the pressure of lubricant in cylinder 302 and line 306 equalizes the force applied by fluid pressure in cylinder 332.

To determine the amount of lubricant remaining in the system after valve 22 is opened, an indicator rod 360 is fixed to piston 330 and coaxially extends through a central bore 362 formed in head 334. The portion of rod normally projecting beyond head 334 may be provided with suitable indicia to indicate the amount of lubricant in cylinder 302.

When it is desired to close valve 22 from an open position, control valve 134 is turned to respectively connect lines 136 and 138 to lines 301 and 350. As a result, any fluid pressure in cylinders 286 and 332 is exhausted and motor operating fluid pressure is applied to piston 292 in cylinder 288 to turn valve stem 56 in a clockwise direction as viewed from FIGURE 4. When piston 290 reaches a position corresponding to a position of valve plug of approximately five degrees from its fully closed position, it engages plunger 236. Further movement of piston 290, as previously described, shifts plunger 236 off its seat 242 to the position shown in the drawings where the operator and lubricating device are now positioned for another closing operation of valve 22.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for effecting automatic lubrication of a plug valve of the type wherein a plug is mounted on a seating surface in a valve body for rotation between angularly spaced apart fully valve closed and opened positions where it blocks and provides for fluid flow through said body, said apparatus comprising
    (a) means for supplying pressurized lubricant to said seating surface, and
    (b) means responding to rotation of said plug to block the supply of lubricant to said seating surface during movement of said plug between a predetermined intermediate position and said opened position, said intermediate position being located angularly between said fully closed and opened positions.

2. In a pressure lubricated plug valve assembly having a valve body formed with a fluid passage, seats in said body, and a valve plug mounted on said seats for rotation between fully closed and fully opened positions where it blocks and provides for fluid flow through said passage, the improvement comprising:
    (a) means providing a lubricant reservoir adapted to contain a body of lubricant,
    (b) lubricant conduit means communicating with said reservoir for supplying lubricant under pressure to said seating surfaces,
    (c) a fluid motor energizable by pressure fluid to feed reservoir lubricant under pressure into said conduit means,
    (d) valve means disposed in said conduit means and actuatable between opened and closed positions to respectively provide and block flow of lubricant through said conduit means, and
    (e) means correlating actuation of said valve means with rotation of said plug to maintain said valve means opened only when said plug is disposed at said fully closed position or between said fully closed position and an intermediate position located angularly between said fully closed and opened positions.

3. A pressure lubricated plug valve assembly having a valve body formed with a flow passage, seats in said body, a valve plug rotatably mounted on said seats and having a through port adapted to align with said flow passage in valve open position and to block said passage in valve closed position, a valve operating stem operatively connected to said plug and lubricant grooves in said seats, the improvement comprising:
    (a) means correlated with the application of torque to said stem to rotate said plug from its fully closed position towards its opened position for initiating supply of lubricant under pressure to said grooves, and
    (b) means correlated with movement of said plug to a predetermined intermediate position between said fully closed and fully opened positions to block supply of lubricant to said grooves during movement of said plug from said intermediate position to said fully opened position.

4. A pressure lubricated plug valve assembly having a valve body formed with a flow passage, seats in said body, a valve plug rotatably mounted on said seats and having a through port adapted to align with said flow passage in valve opened position and to block said passage in valve closed position, a valve operating stem operatively connected to said plug and lubricant grooves in said seats, the improvement comprising:

(a) lubricant passage means communicating with said grooves, and (b) a lubricant reservoir adapted to contain a body of lubricant, (c) means for feeding reservoir lubricant under pressure into said passage means during opening movement of said valve plug from fully closed position, (d) valve means in said passage means and actuatable to block flow of lubricant through said passage means, and (e) motion transmitting means connected to said valve stem, said motion transmitting means coacting with pressurized lubricant in said passage means to enable automatic actuation of said valve means to block flow of lubricant upon predetermined initial rotation of said valve plug from fully closed position.

5. The pressure lubricated plug valve assembly defined in claim 4 wherein said motion transmitting means comprises a power operator having:

(a) a cylinder, (b) a fluid pressure actuated power element displaceable in said cylinder, and (c) means connecting said power element to said valve stem.

6. The pressure lubricated plug valve assembly defined in claim 5 wherein said means for forcing reservoir lubricant under pressure into said passage means comprises a fluid motor, and a source of motor operating fluid connected to energize said fluid motor.

7. The pressure lubricated plug valve assembly defined in claim 6 comprising means connecting said source of motor operating fluid to actuate said power element.

8. The pressure lubricated plug valve assembly defined in claim 6 comprising means supporting said fluid motor on said cylinder.

9. The pressure lubricated plug valve defined in claim 8 wherein said passage means comprises a cylinder head for said cylinder and having a passageway, said valve means being operably mounted in said passageway.

10. The pressure lubricated plug valve assembly defined in claim 9 wherein said valve means comprises a plunger and a coacting valve seat in said passageway, said plunger being so mounted as to be displaceably urged toward said valve seat by pressurized lubricant in said passageway, said power element engaging said plunger during said predetermined initial movement of said valve plug to prevent said plunger from engaging said seat under the bias applied by pressurized lubricant.

11. The pressure lubricated plug valve assembly defined in claim 4 comprising means for selectively adjusting the position of said valve plug relative to said valve body flow passage at which flow of lubricant to said seating surface means is initiated.

12. An apparatus adapted for operating and automatically lubricating a plug valve of the type wherein a plug having an operating stem is rotatably mounted on a seating surface in a valve body, said apparatus comprising:

(a) a reversible fluid motor having a movable power element adapted to be operably connected to said stem and being energizable to rotate said stem in a selected direction, and (b) means under the control of said fluid motor for automatically furnishing pressurized lubricant to said seating surface and responding to movement of said power element to a predetermined position to block the supply of pressurized lubricant to said seating surface at least during opening movement of said valve plug from a predetermined intermediate position between valve closed and opened positions to said opened position.

13. In combination with a plug valve having a body, a valve plug rotatably mounted on a seating surface in said body, and an operating stem operatively connected to said plug for rotating said plug between positions providing and blocking fluid flow through said body, a valve operating an automatic lubricating apparatus comprising:

(a) a first fluid motor adapted to be operatively connected to said valve plug and being energizable to rotate said plug in a selected direction, (b) a lubricant system adapted to supply lubricant to said seating surface, (c) a second fluid motor energizable to pressurize lubricant in said system, and (d) means including a common source of motor operating fluid which is independent of the pressurized lubricant in said system for simultaneously energizing both said first and second motors.

14. The combination defined in claim 13 comprising means cooperating with said second fluid motor to deliver lubricant in said system to said seating surface at a pressure which is greater than the pressure applied to energize said first fluid motor.

15. In a plug valve power operator and automatic lubricating apparatus adapted for a lubricated plug valve of the type wherein a valve plug having an operating stem is rotatably mounted on seating surfaces in a valve body, (a) a first fluid motor having a rigidly mounted cylinder and a power element reciprocable in said cylinder and being adapted to be operatively connected to said stem to effect rotation thereof in a selected direction, (b) lubricant passage forming means adapted to supply pressurized lubricant to said seating surfaces and including a head for said cylinder, (c) means including a second fluid motor energizable to feed pressurized lubricant into said passage means, and (d) means independent of said pressurized lubricant for furnishing fluid under pressure to energize said first and second fluid motors.

16. In a plug valve power operator and automatic lubricating apparatus adapted for a lubricated plug valve of the type wherein a valve plug having an operating stem is rotatably mounted on seating surfaces in a valve body, (a) a first fluid motor having a rigidly mounted cylinder and a power element reciprocable in said cylinder and being adapted to be operatively connected to said stem to effect rotation thereof in a selected direction, (b) lubricant passage means adapted to supply pressurized lubricant to said seating surfaces and including a cylinder head fixed to said cylinder and having a lubricant passageway, (c) means including a second fluid motor energizable to feed pressurized lubricant into said passage means, (d) a valve seat formed in said passageway, and (e) a valve member slidably carried in said head coaxially with said power element and adapted to coact with said seat to block flow of lubricant through said passageway, (f) said valve member being so disposed as to be acted on by opposed axial forces respectively applied by said power element and pressurized lubricant in said passageway, (g) said power element being operable upon predetermined displacement in a direction corresponding to initial opening movement of said valve plug to permit the pressurized lubricant in said passageway to urge said valve member into engagement with said seat.

17. In combination with a plug valve having a body, a valve plug rotatably mounted on a seating surface in said body, and an operating stem operatively connected to said plug for rotating said plug between fully closed and opened positions where it respectively blocks and provides for fluid flow through said body, a valve operating and lubricating apparatus compirsing:

(a) a first fluid motor operatively connected to said stem and being actuatable by fluid pressure to apply torque to said stem for rotating said plug from fully closed to opened positions,
(b) means including a second fluid pressure actuated fluid motor for feeding pressurized lubricant to said seating surface,
(c) means for supplying pressurized fluid to actuate said first motor for rotating said plug from said fully closed to said opened positions,
(d) further means for supplying pressurized fluid for actuating said second motor to supply pressurized lubricant to said seating surface concomitantly with the torque applied by said first motor to said stem to rotate said plug from said fully closed position, and
(e) means correlated with the opening movement of said plug to a predetermined intermediate position between said fully closed and opened positions for interrupting the supply of pressurized lubricant to said seating surface.

References Cited by the Examiner
UNITED STATES PATENTS

| | | | |
|---|---|---|---|
| 1,946,235 | 2/1934 | Riley | 137—246.14 |
| 2,042,066 | 5/1936 | Leach | 137—246.13 X |
| 2,169,525 | 8/1939 | Goldberg | 137—246.13 |
| 3,010,539 | 11/1961 | Goff | 137—246.22 X |
| 3,052,317 | 9/1962 | Leach | 137—246.13 X |

WILLIAM F. O'DEA, *Primary Examiner.*

CLARENCE R. GORDON, *Examiner.*